(12) United States Patent
Jones

(10) Patent No.: US 7,028,731 B1
(45) Date of Patent: Apr. 18, 2006

(54) HOPPER COVER FOR EQUIPMENT

(76) Inventor: Willie Lee Jones, 1137 Pinot Noir Dr., Lodi, CA (US) 95240

( * ) Notice: Subject to any disclaimer, the term of this patent is extended or adjusted under 35 U.S.C. 154(b) by 360 days.

(21) Appl. No.: 10/455,919

(22) Filed: Jun. 6, 2003

(51) Int. Cl.
*B65D 65/02* (2006.01)

(52) U.S. Cl. .................................................. 150/154

(58) Field of Classification Search ............... 150/154, 150/157, 158, 165, 167
See application file for complete search history.

(56) References Cited

U.S. PATENT DOCUMENTS

| | | | |
|---|---|---|---|
| 4,727,977 A * | 3/1988 | Arnson | 198/550.01 |
| 4,840,855 A * | 6/1989 | Foti et al. | 429/120 |
| 6,012,184 A * | 1/2000 | Childers | 5/416 |
| 6,179,463 B1 * | 1/2001 | Daniels-Romero | 366/349 |
| 6,209,953 B1 * | 4/2001 | Mackay et al. | 297/184.13 |
| 6,481,791 B1 * | 11/2002 | Facchini et al. | 297/184.13 |

* cited by examiner

*Primary Examiner*—Tri M. Mai

(57) ABSTRACT

A hopper cover for equipment for preventing grain spills and protecting the grain from precipitation. The hopper cover for equipment includes a sheet of material being removably engaged about an open end of a hopper and having an opening being disposed therethrough and also having an outer edge; and also includes a fastening member being disposed along the edge of the sheet of material for engaging the sheet of material about the hopper; and further includes a closure member including a piece of material being removably fastened to the sheet of material and being removably disposed over the opening of the sheet of material, and also including a fastener being attached to the sheet of material and to the piece of material.

7 Claims, 2 Drawing Sheets

HOPPER COVER FOR EQUIPMENT

BACKGROUND OF THE INVENTION

1. Field of the Invention

The present invention relates to hopper cover for augers and more particularly pertains to a new hopper cover for equipment for preventing grain spills and protecting the grain from precipitation.

2. Description of the Prior Art

The use of hopper cover for augers is known in the prior art. More specifically, hopper cover for augers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,290,139; U.S. Pat. No. 5,613,451; U.S. Pat. No. 3,664,270; U.S. Pat. No. 4,821,648; U.S. Pat. No. 5,063,858; and U.S. Pat. No. Des. 275,378.

While these devices fulfill their respective, particular objectives and requirements, the aforementioned patents do not disclose a new hopper cover for equipment. The prior art includes lids and caps being placed over hoppers.

SUMMARY OF THE INVENTION

The general purpose of the present invention, which will be described subsequently in greater detail, is to provide a new hopper cover for equipment which has many of the advantages of the hopper cover for augers mentioned heretofore and many novel features that result in a new hopper cover for equipment which is not anticipated, rendered obvious, suggested, or even implied by any of the prior art hopper cover for augers, either alone or in any combination thereof. The present invention includes a sheet of material being removably engaged about an open end of a hopper and having an opening being disposed therethrough and also having an outer edge; and also includes a fastening member being disposed along the edge of the sheet of material for engaging the sheet of material about the hopper; and further includes a closure member including a piece of material being removably fastened to the sheet of material and being removably disposed over the opening of the sheet of material, and also including a fastener being attached to the sheet of material and to the piece of material. None of the prior art includes the combination of the elements of the present invention.

There has thus been outlined, rather broadly, the more important features of the hopper cover for equipment in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new hopper cover for equipment which has many of the advantages of the hopper cover for augers mentioned heretofore and many novel features that result in a new hopper cover for equipment which is not anticipated, rendered obvious, suggested, or even implied by any of the prior art hopper cover for augers, either alone or in any combination thereof.

Still another object of the present invention is to provide a new hopper cover for equipment for preventing grain spills and protecting the grain from precipitation.

Still yet another object of the present invention is to provide a new hopper cover for equipment that is easy and convenient to attach about a hopper of an auger.

Even still another object of the present invention is to provide a new hopper cover for equipment that allows the user to easily remove the hopper cover and store it for reuse.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
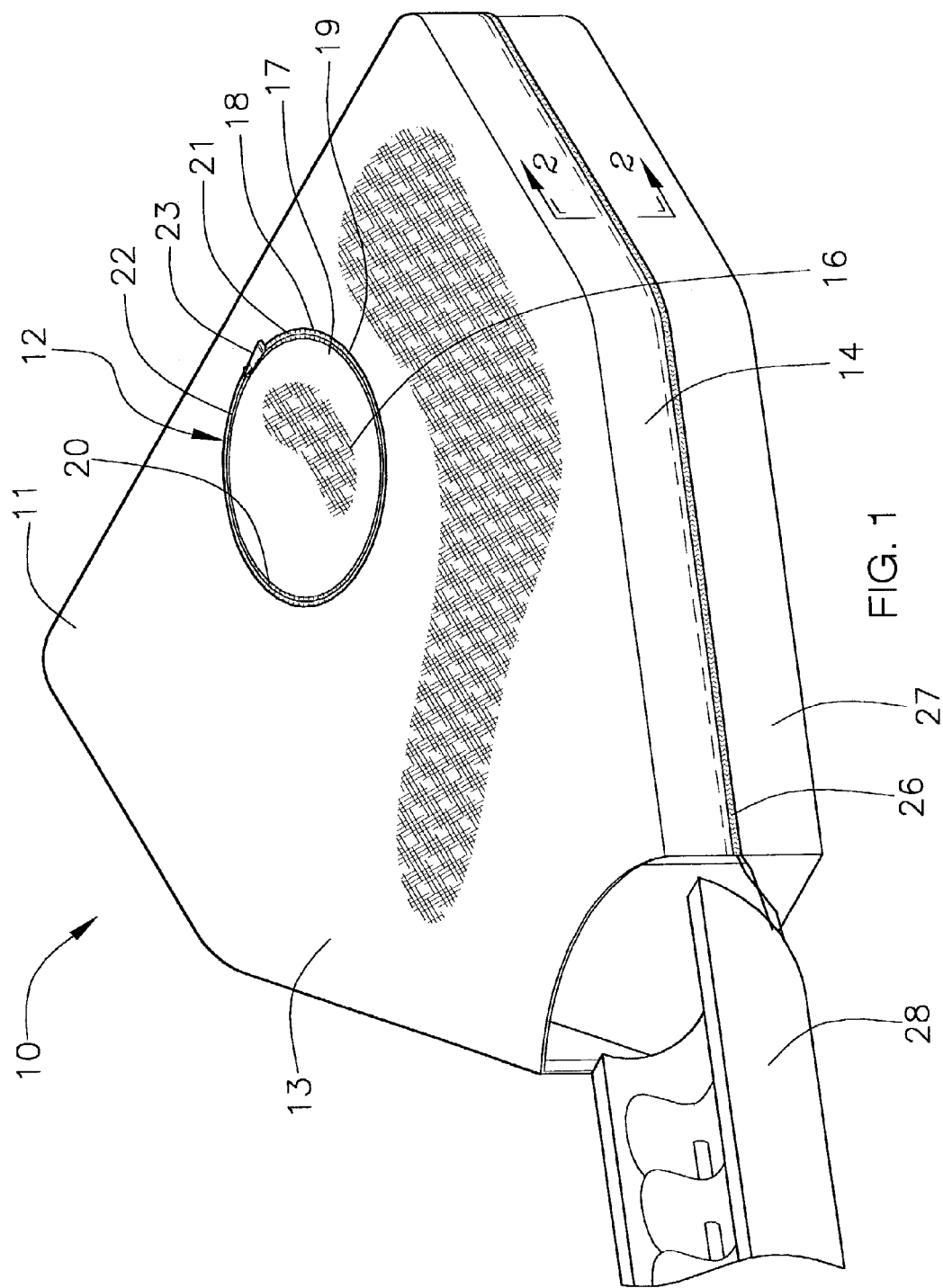
FIG. 1 is a perspective view of a new hopper cover for equipment according to the present invention.
Figure 2:
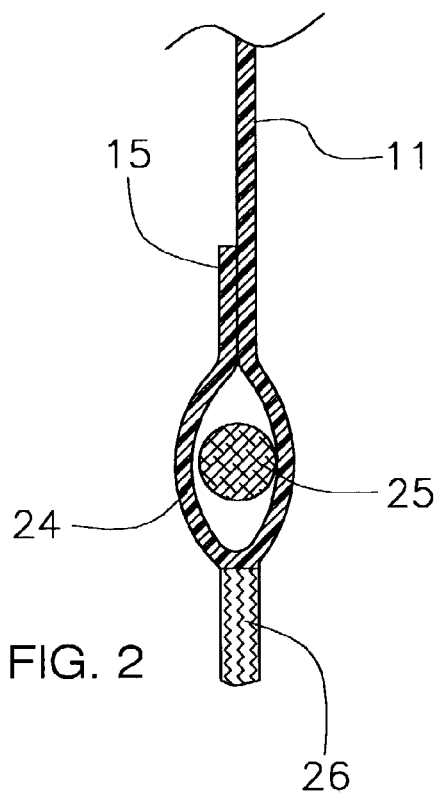
FIG. 2 is a partial cross-sectional view of the outer edge of the sheet of material of the present invention.
Figure 3:
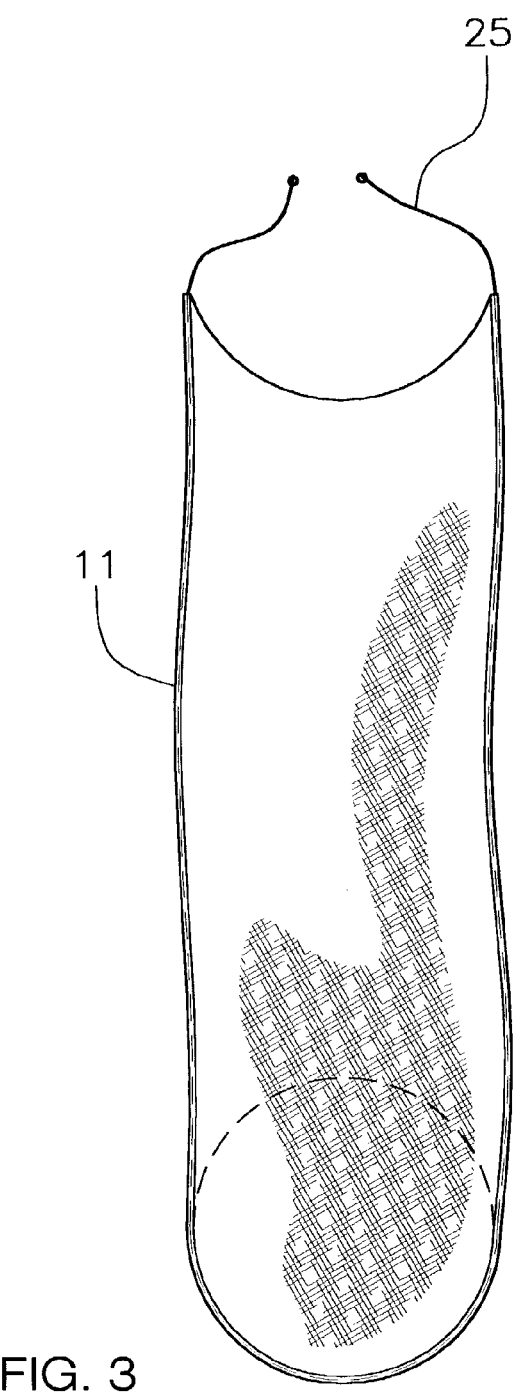
FIG. 3 is a side elevational view of the present invention.

With reference now to the drawings, and in particular to FIGS. 1 through 3 thereof, a new hopper cover for equipment embodying the principles and concepts of the present invention and generally designated by the reference numeral 10 will be described.

As best illustrated in FIGS. 1 through 3, the hopper cover for equipment 10 generally comprises a sheet of material 11 being removably engaged about an open end of a hopper 27 of an auger 28 and having an opening 12 being disposed therethrough and also having an outer edge 15. The sheet of material 11 is pentagonal-shaped having a main portion 13 and a perimeter portion 14. The opening 12 of the sheet of material 11 is circular-shaped.

A closure member includes a piece of material 16 being removably fastened to the sheet of material 11 and being removably disposed over the opening 12 of the sheet of material 11, and also includes a fastener being conventionally attached and sewn to the sheet of material 11 and to the piece of material 16. The piece of material 16 is circular-shaped and has an outer edge 17. The fastener includes a zipper 18 having elongate strips of material 19,20 being securely attached and sewn along an edge of the opening 12 of the sheet of material 11 and along the outer edge 17 of the piece of material 16, and also having teeth 21,22 being conventionally attached along edges of the strips of material 19,20, and further having a teeth connector 23 for interlocking and separating the teeth 21,22.

A fastening member is conventionally disposed along the outer edge 15 of the sheet of material 11 for engaging the sheet of material 11 about the hopper 27. As a first embodiment, the outer edge 15 of the sheet of material 11 is an elongate tubular portion 24 having open ends and a bore extending therethrough. The fastening member is a drawstring 25 being disposed through the open ends and in the bore of the elongate tubular portion 24 for fastening the perimeter portion 14 about the hopper 27.

As a second embodiment, the fastening member is an elastic band 26 being conventionally attached along the outer edge 15 of the sheet of material 11 for fastening the perimeter portion 14 about the hopper 27.

In use, the user would drape the sheet of material 11 over the open end of the hopper 27 and would tighten the sheet of material 11 about the hopper using either the drawstring 24 or the elastic band 26. The use can open a portion of the sheet of material 11 to view inside the hopper 27 by unzipping the zipper and removing the piece of material 16 from over the opening 12 through the sheet of material 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the hopper cover for equipment. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hopper cover for equipment comprising:
    a sheet of material being removably engaged about an open end of a hopper and having an opening being disposed therethrough and also having an outer edge, said sheet of material being pentagonal-shaped having a main portion and a perimeter portion;
    a fastening member being disposed along said outer edge of said sheet of material for engaging said sheet of material about the hopper;
    a closure member including a piece of material being removably fastened to said sheet of material and being removably disposed over said opening of said sheet of material, and also including a fastener being attached to said sheet of material and to said piece of material.

2. The hopper cover for equipment as described in claim 1, wherein said opening of said sheet of material is circular-shaped.

3. The hopper cover for equipment as described in claim 2, wherein said piece of material is circular-shaped and has an outer edge.

4. The hopper cover for equipment as described in claim 3, wherein said fastener includes a zipper having elongate strips of material being securely attached along an edge of said opening of said sheet of material and along said outer edge of said piece of material, and also having teeth being attached along edges of said strips of material, and further having a teeth connector for unlocking and locking said teeth.

5. The hopper cover for equipment as described in claim 4, wherein said outer edge of said sheet of material is an elongate tubular portion having open ends and a bore extending therethrough.

6. The hopper cover for equipment as described in claim 5, wherein said fastening member is a drawstring being through said open ends and in said bore of said elongate tubular portion for fastening said perimeter portion about the hopper.

7. The hopper cover for equipment as described in claim 4, wherein said fastening member is an elastic band being attached along said outer edge of said sheet of material for fastening said perimeter portion about the hopper.

\* \* \* \* \*